May 19, 1936. H. O. VON ROSENBERG 2,041,034
MOUTH SPREADER
Filed Feb. 18, 1935
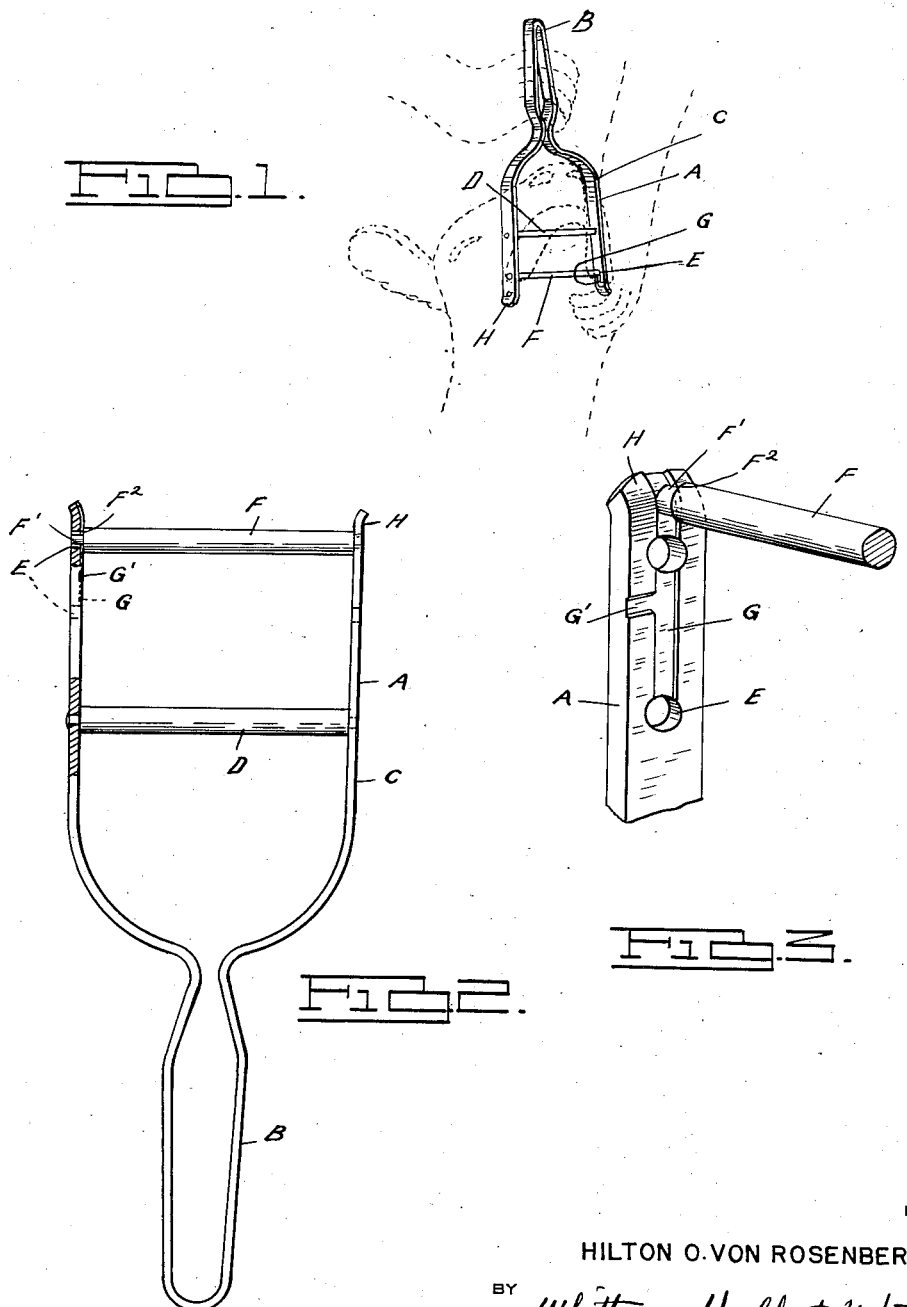
INVENTOR
HILTON O. VON ROSENBERG
ATTORNEYS Patented May 19, 1936

2,041,034

UNITED STATES PATENT OFFICE 2,041,034

MOUTH SPREADER

Hilton O. von Rosenberg, Hallettsville, Tex., assignor to Parke, Davis & Company, Detroit, Mich., a corporation of Michigan Application February 18, 1935, Serial No. 7,141

5 Claims. (Cl. 128—14)

The invention relates to mouth spreaders such as are used in holding the mouths of animals open during the administration of capsules. It is the object of the invention to obtain a construction such that a single instrument may be used for different animals, large and small, and such that one may quickly adjust it to correspond to the size of the mouth and the extent of opening thereof. To this end the invention consists in the construction as hereinafter set forth.

In the drawing:

Fig. 1 is a perspective view illustrating the spreader in use;

Fig. 2 is a front elevation partly in section;

Fig. 3 is a perspective view of one of the furcations of the spreader showing the manner of adjustably engaging the cross bar therewith.

My improvement comprises essentially a handled frame bifurcated to embrace the muzzle of the animal and having a pair of cross bars between the furcations spaced from each other to correspond to the distance that the mouth is to be opened. To adapt the instrument for use with animals of different size, these cross bars are relatively adjustable to enlarge or diminish the space therebetween.

In detail, A is the frame, preferably formed of a flat metal bar bent to form a handle portion B and the bifurcated portion C. D is a cross bar extending between the central portion of the furcations and rigidly secured thereto at its opposite ends. Outward beyond this cross bar the furcations are provided with a series of apertures E for receiving a second cross bar F. This is formed with pintles F' of reduced diameter at its opposite ends adapted to engage the apertures E and with shoulders F² between the pintles and the larger diameter of the bar which shoulders are spaced from each other to correspond to the space between the furcations. The cross bar F may be engaged with any pair of aligned apertures E in the furcations C by spreading these furcations which, being formed of resiliently flexible material, will permit of such action. When the pintles are engaged with the apertures the furcations will spring back against the shoulders F² preventing disengagement of the bar. However, the bar which is circular in cross section is free to turn as a roller, this facilitating its introduction into the animal's mouth.

To facilitate the engagement and disengagement of the bar F, one of the furcations is preferably provided with a groove G on its inner face extending from the outer end of the furcation inward to the innermost of the apertures E. This groove serves to guide the pintle into engagement with the desired aperture after the pintle at the opposite end of the bar has been engaged with the corresponding aperture in the opposite furcation. The ends of the furcations are slightly flared outward as indicated at H and if desired the groove G may be provided with a cross groove G' intermediate the apertures E for engagement of the pintle from one side of the furcation.

With the construction as described, in use, the cross bar F is first adjusted in position to suit the size of mouth of the animal operated upon, after which the cross bars F and D are inserted in the mouth and the frame then turned to spread the jaws apart. In this turning movement the fact that the cross bar F is a roller facilitates its movement to the desired position. The capsule may then be inserted in the mouth by the use of suitable forceps which, however, form no part of the present invention.

What I claim as my invention is:

1. A mouth spreader comprising a bifurcated frame, a cross bar extending between the furcations of said frame and rigidly secured thereto, said furcations being resiliently yieldable and provided with a plurality of pairs of aligned apertures differently spaced from said cross bar and a second cross bar engageable alternatively with the different pairs of aligned apertures by the spreading of said resilient furcations.

2. A mouth spreader comprising a bifurcated frame having a cross bar extending between the central portion of the furcations thereof and rigidly secured thereto at its opposite ends, the furcations beyond said bar being resiliently flexible and being provided with a plurality of pairs of aligned apertures differently spaced from said cross bar, a second cross bar having pintles at its opposite ends of reduced diameter and shoulders at the inner ends of said pintles spaced from each other to correspond to the distance between the inner faces of said furcations whereby the pintles of said bar may be alternatively engaged with the pairs of aligned apertures to vary the spacing between the same and the stationary bar.

3. A mouth spreader comprising a bifurcated frame having a cross bar extending between the central portion of the furcations thereof and rigidly secured thereto, the portion of said furcations beyond said cross bar being resiliently flexible and provided with a plurality of pairs of aligned apertures therein, said apertures being of a diameter less than the diameter of said cross bar, and a second cross bar having pintles at its opposite ends for engaging said apertures and shoulders at the inner ends of said pintles spaced from each other to correspond to the distance between the inner faces of said furcations, the pintles of said bar being engageable alternatively with the pairs of aligned apertures by the spreading of the furcations of said frame and when engaged permitting the turning of said bar as a roller.

4. A mouth spreader comprising a bifurcated frame having a cross bar extending between the central portion of the furcations thereof and rigidly secured thereto at its opposite ends, the portion of the furcations beyond said bar being resiliently flexible and having a plurality of pairs of aligned apertures therein, one of said furcations being further provided with a groove in its inner face extending in alignment with said apertures and a second cross bar having pintles at its opposite ends of a diameter less than that of the bar with shoulders at the inner ends of said pintles spaced from each other to correspond to the distance between the inner faces of said furcations, said bar being adjustably engageable with the different pairs of aligned apertures, but engaging the pintle at one end with one of said apertures and engaging the opposite pintle with said groove to guide the same into engagement with the aligned aperture.

5. A mouth spreader comprising a bifurcated handled frame having a cross bar extending between the central portion of the furcations thereof and rigidly secured thereto at its opposite ends, a portion of said furcations beyond said bar being resiliently flexible and provided with a plurality of pairs of aligned apertures therein, one of said furcations having a groove in its inner face extending from the outer end of the furcation to the several apertures and with a cross groove extending from the side of the furcation to said first mentioned groove intermediate a pair of apertures, and a second cross bar provided at its opposite end with pintles for engaging the aligned apertures and with shoulders at the inner ends of said furcations spaced to correspond to the distance between the inner faces of said furcations, said cross bar being engageable with different pairs of aligned apertures by the insertion of the pintle at one end into one aperture and the guiding of the pintle at the opposite end in said grooves into registration with the aligned aperture.

HILTON O. von ROSENBERG.